(12) United States Patent
Patterson et al.

(10) Patent No.: US 7,654,123 B2
(45) Date of Patent: Feb. 2, 2010

(54) AUTOMATED MANUFACTURING MACHINE

(75) Inventors: Dean James Patterson, Lincoln, NE (US); Steven Peter Camilleri, Northern Territory (AU); Lyell Douglas Embery, Northern Territory (AU)

(73) Assignee: In Motion Technologies Pty. Ltd. (AU)

( * ) Notice: Subject to any disclaimer, the term of this patent is extended or adjusted under 35 U.S.C. 154(b) by 191 days.

(21) Appl. No.: 10/597,758

(22) PCT Filed: Feb. 3, 2005

(86) PCT No.: PCT/AU2005/000125

§ 371 (c)(1),
(2), (4) Date: Aug. 7, 2006

(87) PCT Pub. No.: WO2005/076294

PCT Pub. Date: Aug. 18, 2005

(65) Prior Publication Data

US 2008/0148794 A1 Jun. 26, 2008

(30) Foreign Application Priority Data

Feb. 5, 2004 (AU) .............................. 2004900536

(51) Int. Cl.
*B21C 47/00* (2006.01)
*H02K 15/00* (2006.01)
(52) U.S. Cl. .............................. 72/132; 72/130; 29/596
(58) Field of Classification Search ............ 72/129–132
See application file for complete search history.

(56) References Cited

U.S. PATENT DOCUMENTS

| 2,356,972 | A | * | 8/1944 | Chubbuck ................. 310/40 R |
| 3,283,399 | A | * | 11/1966 | Hart et al. ..................... 29/605 |
| 4,320,645 | A | | 3/1982 | Stanley |
| 4,403,489 | A | * | 9/1983 | Munsterman et al. ........ 72/19.6 |
| 4,909,057 | A | * | 3/1990 | Fritzsche ..................... 72/131 |

FOREIGN PATENT DOCUMENTS

| EP | 0046310 A1 | 2/1982 |
| GB | 1352581 A | 5/1974 |
| SU | 1791907 A1 | 1/1993 |

* cited by examiner

*Primary Examiner*—Dana Ross
*Assistant Examiner*—Debra M Sullivan
(74) *Attorney, Agent, or Firm*—Armstrong Teasdale LLP

(57) ABSTRACT

The present invention provides a method and machine for producing a slotted wound core (50). The machine includes a punch arrangement (16) arranged to punch apertures in a length of material (12*a*), a mandrel (22) for receiving the punched material, a control means and a mandrel indexing means. The positioning of the punch arrangement (16) and the mandrel (22) is fixed and the mandrel (22) is arranged to be rotated by the mandrel indexing means after each operation of the punch arrangement so that a roll of punched material is formed on the mandrel (22). The mandrel (22) is rotated by an amount (&ggr;) determined by the control means. The control means determines the indexed amount so that selected apertures punched in the length of material align with one another when the material (12*a*) is rolled onto the mandrel (22) so that the aligned apertures form respective slots (52) of a desired configuration in the core (50).

9 Claims, 3 Drawing Sheets

AUTOMATED MANUFACTURING MACHINE

FIELD OF THE INVENTION

This invention relates to an automated machine for producing a slotted wound product by punching and winding a length of material. The machine has particular, but not exclusive application for the manufacture of cores of the type found in electric motors and the like.

BACKGROUND OF THE INVENTION

Devices such as electric motors, generators and transformers include a magnetically conducive base which is generally known as a "stator". The stator includes a core and a winding. The winding is typically a copper winding which is located within the slots formed in the core.

Stators typically adopt either one of two basic geometries. The first geometry is known as "radial flux" and the second geometry is known as "axial flux". In a stator having "radial flux" geometry, the flux that generates torque flows in a direction perpendicular to the axis of rotation. In a stator having "axial flux" geometry, the flux that generates torque flows in a direction parallel to the axis of rotation.

Devices including a stator adopting "axial flux" geometry are often referred to as "pancake" devices due to their flat round shape. In contrast, devices adopting "radial flux" geometry are typically drum shaped.

Devices adopting "axial flux" geometry have generally been considered to be advantageous. However, it is recognised that the manufacture of the magnetic core for such devices is difficult.

U.S. Pat. No. 2,356,972 describes a machine for constructing laminated cores for electrical devices. FIG. 1 illustrates the layout of the machine described in U.S. Pat. No. 2,356,972. Cores are formed using a punch and wind process whereby core forming material is punched with apertures and then wound onto a roll 2. To begin the process, the free end of the core forming material is bent at a 90° angle 3 and positioned in a locating slot 4 on the roll 2. The entire roll 2 is then rotated, drawing more material around itself, until a required rotation angle (that is the angle between successive slots in the core) has been achieved. An aperture is then punched into the material by a punch and die arrangement 6. This process is repeated until the desired roll size is achieved.

As illustrated in FIG. 1, the entire roll 2 is located upon a linear slider 7 which allows free vertical movement of the roll 2. Roller 10 ensures that the top of the roll 2 is always maintained at a set height and thus the spring 9 is compressed as the radius of the roll 2 increases.

It will be appreciated by those skilled in the art that the difficulty when producing this form of core is to ensure that the apertures are punched in the material so that they align properly to form the required "straight sided" radial slots. If the apertures are punched at an equal spacing the required "straight sided" slots will not be formed. To address this problem, the machine described in U.S. Pat. No. 2,356,972 includes a ramp 11. The ramp 11 presses against the roll 2 and is arranged to move the punch and die arrangement 6 horizontally away from the roll 2 as the radius of the roll 2 increases. Spring 12 ensures that the ramp 11 is continuously fixed against the roll 2. Brake 14 and guide rollers 13 ensure that the material is fed to the punch and die arrangement 6 in a controlled manner. The horizontal displacement of the punch and die arrangement 6 can, if correctly implemented, produce the required "straight sided" radial slots in the core. Unfortunately, this is not often possible because of the difficulty in maintaining the material between the punch and die arrangement 6 and the roll 2 in a horizontal orientation.

It will also be appreciated that as the punch displacement parts of the machine shown in U.S. Pat. No. 2,356,972 wear, the accuracy of the positioning of the aperture punched by the punch and die arrangement 6 will decrease, leading to malformed slots in the resultant core.

Although other forms of machines have been developed to manufacture cores with "straight sided" radial slots, they all suffer from a lack of precision with regard to the positioning of the punched apertures.

The present invention seeks to provide an improved punch and wind machine.

SUMMARY OF THE INVENTION

According to a first aspect of the present invention there is provided a punch and wind machine for producing a slotted wound core, said machine including a punch arrangement arranged to punch apertures in a length of material, a mandrel for receiving the punched material, a control means and a mandrel indexing means, wherein the positioning of said punch arrangement and said mandrel is fixed and said mandrel is arranged to be rotated by the mandrel indexing means after each operation of the punch arrangement so that a roll of punched material is formed on the mandrel, said mandrel being rotated by an amount determined by the control means, and said control means determining the indexed amount so that selected apertures punched in the length of material align with one another when the material is rolled onto the mandrel whereby the aligned apertures form respective slots of a desired configuration in the core.

Preferably, the desired configuration of the slot is "straight sided" and radially extending.

Preferably, the mandrel is arranged to be rotated by small and adjustable amounts by the mandrel indexing means.

Preferably, the slots produced in the core are radial to the roll of material and have side walls which are substantially straight. It will be appreciated however that varying slot geometry or combination of geometries may be produced by said machine.

Preferably, the punch and wind machine also includes a roll measuring means for measuring a dimension of the roll of punched material on the mandrel. The roll measuring means may include a linear differential transformer (LVDT) or similar. The measured dimension preferably being provided as an input to the control means. The measured dimension of the roll of punched material is preferably the radius of the roll of punched material on the mandrel.

The control means is preferably arranged to determine an index amount using an algorithm and the measured dimension of the roll of punched material on the mandrel.

Preferably, the punch and wind machine also includes first roll means arranged to maintain a desired tension on the length of material during operation of the punch and wind machine. The first roll means may also serve to enable accurate pre-feed of a first portion of the length of material during a pre-feed operation of the punch and wind machine. The first roll means is preferably driven by a servo control.

Preferably, the punch and wind machine also includes second roll means arranged to direct the punched material onto the mandrel. In accordance with a preferred embodiment of the invention, in addition to directing the punched material onto the mandrel, the second roll means serves to maintain the un-punched material perpendicular to the punch arrangement.

The second roll means is preferably formed as a pair of free running rollers. In an alternative embodiment of the invention, a single running roller may be used provided that the angle presented by the material as it leaves the rollers never crosses the horizontal plane when winding a complete roll.

Preferably, the mandrel includes a temporary fixing means arranged to attach a leading end of the material to the mandrel after the pre-feed. The fixing means preferably includes a radial slot cut into the mandrel which is arranged to receive the leading end of the material.

In order to complete the core and allow its removal as a self supporting structure, the material must be cut and then the loose end permanently affixed to the completed core. Preferably, cutting means is provided in the form of a selectable attachment incorporated into the punching arrangement. The cut or loose end of the material is preferably affixed to the completed core by spot welding it thereto, or by applying an adhesive thereto. The machine preferably incorporates a welding arrangement and/or an adhesive applying arrangement.

Preferably, a core ejection means is also incorporated into the mandrel. The core ejection means being arranged to automatically eject the core once it is completed.

The control means preferably includes a digital computing element arranged to read the value of the radius of material on the mandrel measured by the roll measuring means. The digital computing element is preferably further arranged to calculate the change in mandrel angle that must be made in order to punch apertures in the material so as to ensure that selected apertures in the length of material align with one another when rolled onto the mandrel thereby forming respective slots in the core.

Preferably, the control means is arranged to determine the radius of the roll of material on the mandrel, initiate the mandrel indexing means to rotate the mandrel by a calculated index angle so as to draw more material around the roll of material formed on the mandrel, actuate the punch arrangement so as to cause an aperture to be punched in the length of material and then repeat this process until the desired radius of material is located on the mandrel.

The control means is arranged to provide very accurate control of the mandrel indexing means. This ensures the accuracy of the slot being formed in the roll of material on the mandrel. It will also be appreciated that variation in the shape of the slots formed in the roll of material on the mandrel may be produced by varying the functional operation of the control means, without need to vary the physical construction or restraints of the punch and wind machine.

In accordance with a second aspect of the invention there is provided a method of forming a magnetically conducive core having adjacent radial slots separated by an angle α, said method including the steps of:
(a) Feeding a length of material through a punch arrangement and attaching an end of the material to a mandrel;
(b) Calculating a length BC of the material between a first point B and a second point C, where point B is the point of intercept between a punch center of the punch arrangement and the material and the second point C is the point of contact between material wound on the mandrel and a roll radius measuring means;
(c) Determining a next aperture punch point position A on the material, said position A being determined by the steps of:
I. Determining the angle θ about a centre point of the mandrel between a radial extending to point C and a radial forming a centre line of a slot which the aperture at point A will extend when laid against a circumference of the roll of material on the mandrel;
II. Determining a length AC of material between a first point A and a second point C, where AC is determined by the equation:

$$AC = \theta\left(\frac{\theta \times t}{4\pi} + r\right) \qquad \text{(Equation 1)}$$

Where r is the radius of the roll measured at C by the roll radius measuring means and t is the thickness of the material to be punched;
III. Calculating a length of material AB between the first point A and a third point B, where AB is determined by the equation:

$$AB = AC - BC$$

(d) Calculating a mandrel rotation index angle γ required to achieve a feed length AB, where γ is determined by the equation:

$$\gamma = \frac{-r + \sqrt{r^2 + \frac{t \times AB}{\pi}}}{\frac{t}{2\pi}} \qquad \text{(Equation 2)}$$

(e) Rotating the mandrel by index angle γ;
(f) Punching an aperture in the material using the punch arrangement; and
(g) Repeating steps (b) to (f) until a desired core radius is achieved.

Equation 2 may serve as only an approximation of the necessary rotation angle due, for example, to variations in the path length resulting from a spiral configuration of the roll of material on the mandrel. In order to provide correction for this approximation, step d) may be replaced by a more accurate iterative numerical calculation such as a binary search algorithm, incorporating Equation 2.

Preferably, during an initial pre-feed operation, the material is fed until is contacts the mandrel and is then fed into a mandrel fixing means. The mandrel fixing means typically includes a radial slot formed in the mandrel. When the mandrel is first indexed the material adjacent the slot is caused to bend thereby affixing the material to the mandrel.

Preferably, after one complete rotation of the mandrel, a permanent fixing means is applied to attach a first layer of material on the mandrel to a second layer so as to thereby prevent an inside diameter of the roll of material from unwinding when it is removed from the mandrel.

Preferably, when a desired outside diameter of the roll of material on the mandrel is achieved, a cutting means cuts the material at a desired point and an attaching means permanently affixes the cut end of the material to the roll so as to prevent the roll unwinding.

Preferably, the completed roll is ejected automatically.

Preferably, all of the steps of the above process occur automatically so that the process can be managed without need for human interaction.

In accordance with a preferred embodiment of the invention, once the desired core radius is achieved, the roll is removed from the mandrel. A first portion of the length of material on the roll (that is the portion of the material which was not punched) is then cut from the roll. Accordingly, the slots formed by the apertures in the material will extend from the circumference of the roll to the centre.

A fixing means may then be used to fix the ends of the roll to prevent inadvertent unwinding of the roll.

Preferably, between step (a) and step (b), the initial feeding process is driven and halted using the first roll means rather than by indexing the mandrel. Apertures are punched in the material at appropriate locations, resuming the feed process thereafter until the material reaches the location of a mandrel fixing means. This eliminates the need to remove a first portion of the length of material after the roll of material is ejected from the mandrel.

The invention also provides a wound core manufactured in accordance with the second aspect of the invention.

DESCRIPTION OF THE DRAWINGS

Embodiments of the invention will now be described, by way of example only, with reference to the accompanying drawings in which.

DETAILED DESCRIPTION OF THE PREFERRED EMBODIMENTS

Figure 1:
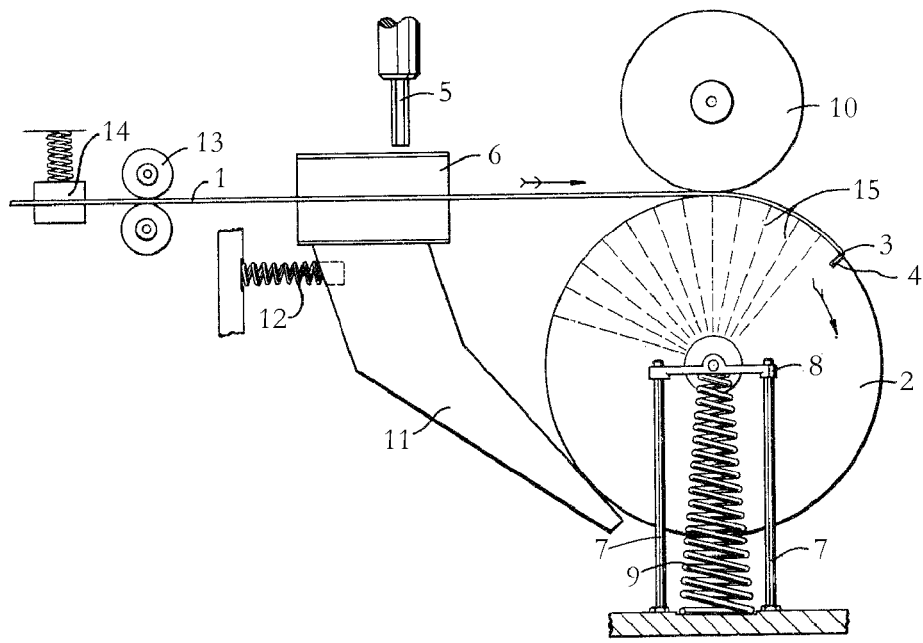
FIG. 1 is a side view of the core manufacturing machine described in U.S. Pat. No. 2,356,972.
Figure 2:
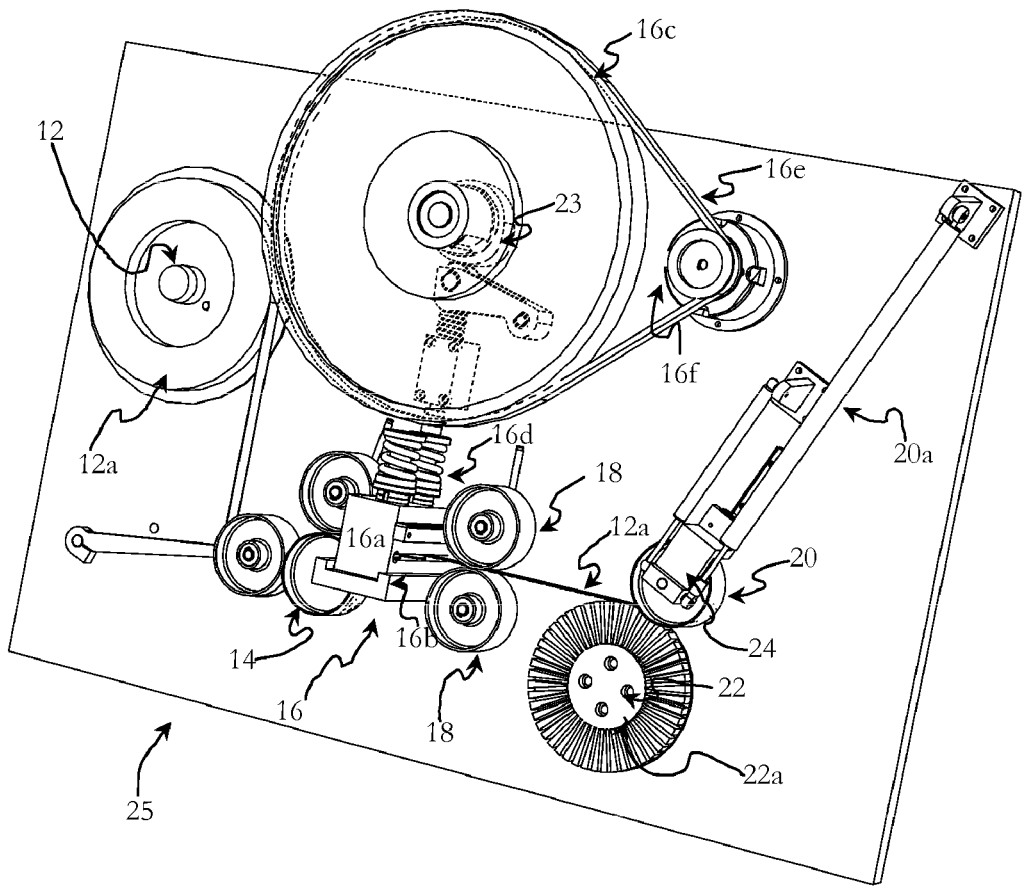
FIG. 2 is a perspective view of a machine in accordance with a first embodiment of the invention.

FIG. 2 illustrates a punch and wind machine 25 in accordance with an embodiment of the invention. The machine 25 includes a material spool mount 12, a tensioning roller set 14, a punch and die arrangement 16, a pair of stabilising rollers 18, a build roller 20 and a mandrel 22.

Figure 5:
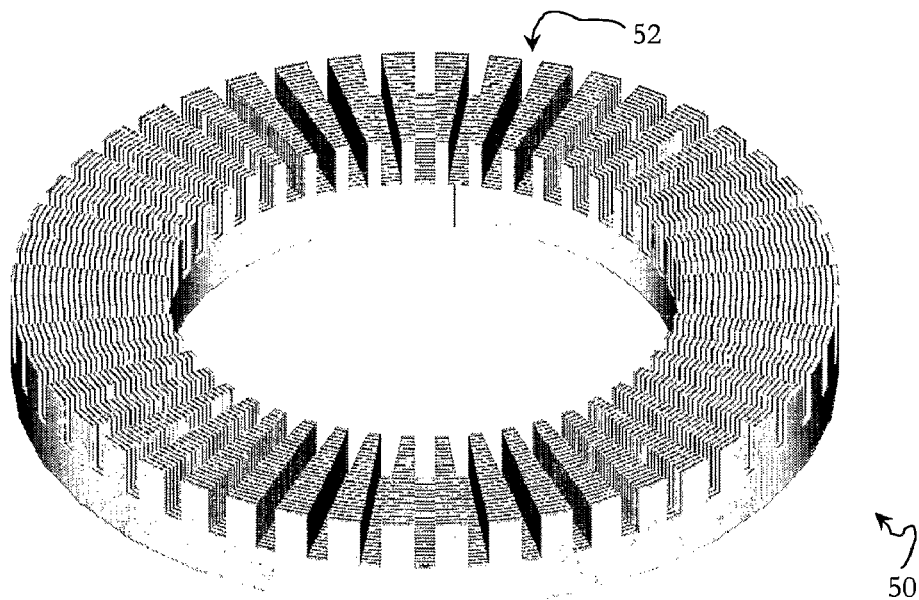
FIG. 5 is a perspective illustration of a magnetically conducive core manufactured by a machine in accordance with an embodiment of the invention.

The spool mount 12 is arranged to receive a roll of material 12a which when punched by the punch and die arrangement 16 and then rolled onto the mandrel 22 forms a core 50 having "axial flux" geometry. In other words, the core 50 (FIG. 5) includes a plurality of "straight sided" slots 52 formed therein.

The punch and die arrangement 16 includes a punch 16a, a die 16b, a flywheel 16c and a spring biased push rod 16d. The flywheel 16c is driven via a drive belt 16e and a drive pulley 16f. A cam 23 initiates movement of the spring biased push road 16d which drives the punch 16a towards the die 16b. This results in the formation of an aperture in the material 12a.

The machine 25 is arranged so that material 12a feeds from the spool mount 12, around the tensioning roller set 14 and through the punch and die arrangement 16. The material 12a then passes through the pair of stabilising rollers 18 before being contacted by the build roller 20 where after it is rolled onto the mandrel 22.

The leading end of the material 12a is secured to the mandrel 22 by locating it in a mandrel slot 22a during a pre-feed operation. As part of this pre-feed operation, the mandrel 22 is rotated slightly to cause the material 12a adjacent the opening of the slot 22a to bend at an angle of approximately 90° so as to effectively secure the leading end of the material 12a to the mandrel 22.

The build roller 20 is mounted on a linear bearing arrangement 24 so that it can move there along as the radius of the roll of material formed on the mandrel 22 increases. A sensor 20a is attached to build roller 20 and is arranged to measure the radius of the roll of material 12 on the mandrel 22.

Once the pre-feed operation of the machine 25 is complete, a core manufacturing operation can commence. Like the pre-feed operation, the core manufacturing operation is controlled by a programmable machine controller (not illustrated). This controller instructs measurement of the radius of the material 12a on the mandrel 22 by the sensor 20a. The controller (which may include other devices) then calculates the amount by which the mandrel 22 must be indexed to ensure that the aperture next punched in the material 12a by the punch 16a will later align with other punched apertures so as to form the required radially extending slots 52 in the roll of material 12a (that is the core 50 being formed) on the mandrel 22. The mandrel 22 is indexed by a mandrel indexing means (not shown). The mandrel indexing means may take the form of a servo controlled electric drive.

The mandrel 22 is indexed by an angle γ, where γ is determined by the following equation:

$$\gamma = \frac{-r + \sqrt{r^2 + \frac{t \times d}{\pi}}}{\frac{t}{2\pi}} \quad \text{(Equation 3)}$$

where:
γ=index angle with respect to angle of roll measuring means
r=radius as measured by sensor 20a
t=material thickness
d=path length of material between the punch point B and the point of contact C of the build roller 20

Figure 3:
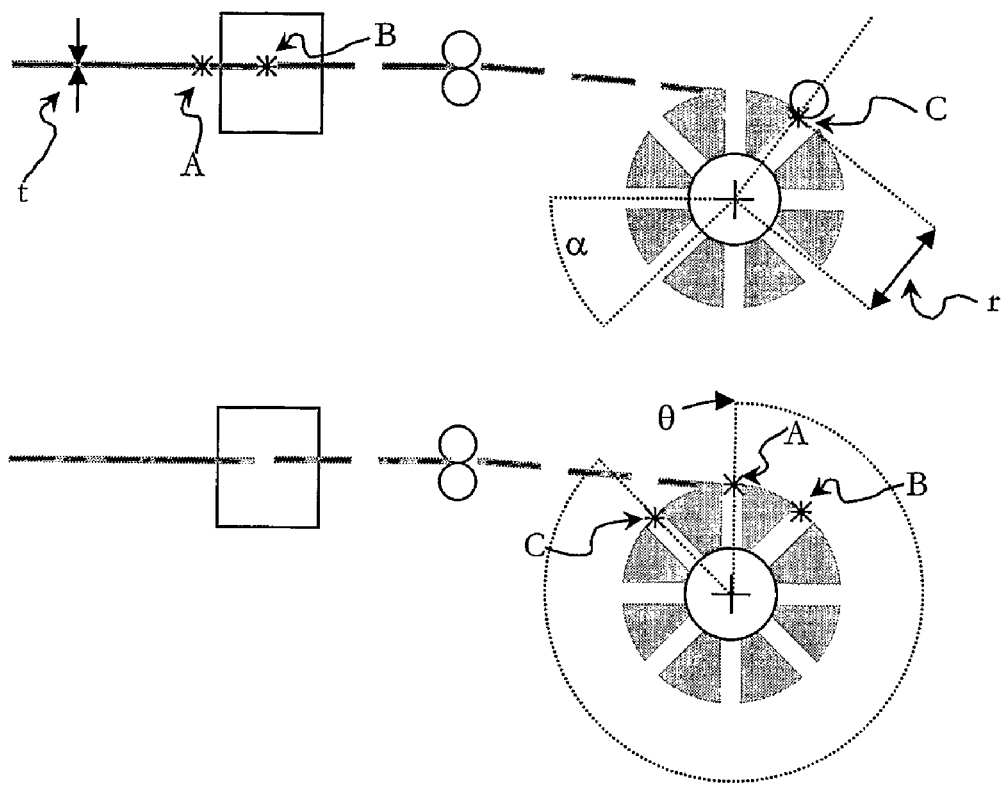
FIG. 3 is a pair of schematic representations of the machine shown in FIG. 2 detailing the important contact points and parameters as used in the Equations, both before and after the punching of six successive apertures.

FIG. 3 illustrates the various contact points and parameters included in Equation 1.

The various parameters included in Equation 3 are preferably determined by appropriate electronic devices. However, measurement of the required parameters may be performed by other appropriate devices. Some parameters which do not change substantially, such as material thickness t, can be manually entered into the controller prior to starting the machine, or measured during operation for increased precision.

For the apertures formed in the material 12a to align in the required fashion once the material 12a is wound into a core 50, the roll radius measurement r performed by sensor 20a must be very accurate. Similarly, each rotation through angle γ of the mandrel 22 by the mandrel indexing means must also be very accurate.

It is desirable for the tensioning roller set 14 to be driven by an electric servo drive so that a fixed torque can be maintained thus controlling the tension of material 12 as it passes between the tensioning roller set 14 and the stabilising rollers 18.

Once the radius of the material 12a on the mandrel 22 reaches its required dimension (i.e. the dimension of the required core 50), the material 12a is cut and the resulting free end is preferably attached to the core 50 using a spot or TIG welding technique. This prevents the material 12a of the core 50 from unwinding. The core 50 is then ejected from the mandrel 22. The cutting and attaching operations are preferably performed by the machine 25 automatically once the desired core size is achieved. The devices required to perform these operations have been omitted from FIGS. 2 and 3 for simplicity.

Figure 6:
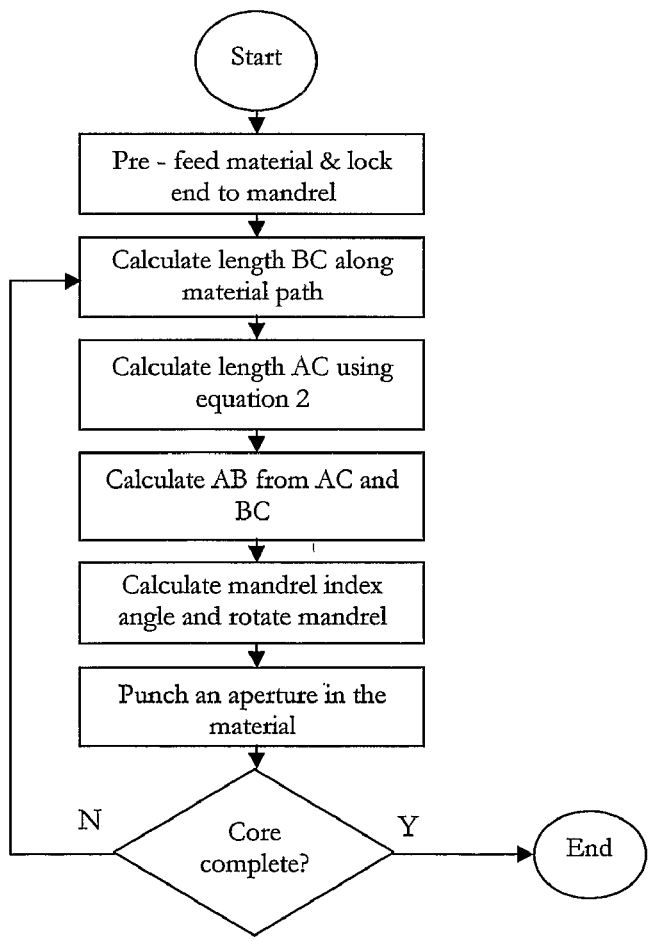
FIG. 6 is a flow chart depicting the process for producing a magnetically conducive core in accordance with an embodiment of the invention.

FIG. 6 is a flow chart depicting the process of the controller during the manufacture of the core 50.

It will be appreciated by those skilled in the art that as proper roll build and tension control are not achievable during the pre-feed operation of the previously described machine 25, it is not possible to correctly punch apertures in the first segment of material 12a rolled onto the mandrel 22. This is due to a lack of position accuracy normally provided by mandrel 22 indexing. Accordingly, this first segment of material must be removed from the core 50 after it is removed from the machine 25 in order to enable the slots formed in the core to extend from the outer circumference of the roll to the inner circumference or centre of the roll.

The punched length of material 12a located between the punch apparatus 20 and the roll of material on the mandrel 22 can be susceptible to over-tensioning due to the reduction in cross section of the material once it is punched. This problem can be ameliorated by employing tension control on the material in this region. Preferably, tensioning roller set 14 employs a servo drive for tension control during normal operation, which can be improved by employing the mandrel drive motor for tension control as well. In order to control material tension, the servo drive attached to the tensioning roller set 14 will typically be operating in "torque control" mode, whereby the torque created by the servo drive motor can be adjusted.

Preferably, to avoid the need to remove the first segment of material 12a from the roll, the servo drive attached to the tensioning roller set 14, which is employed for tension control during normal operation of the machine 25, may be used alternatively as a precise feed mechanism during a pre-feed operation. This is achieved by employing the servo drive in a mode whereby shaft position is controlled by the controller rather than shaft torque since tension control is not required until the material is being pulled by the mandrel drive. It will be appreciated that this allows the material 12a to be fed and then stopped for punching operations before it is affixed to the mandrel 22. As a result of this, apertures can be placed a suitable distance apart, and the need to remove a first segment of the roll of material 12a is negated. Whilst the level of precision possible with this material positioning method is likely to be much less than that normally obtained with the precise feed during normal operation, the number of apertures punched in the material 12 is low and the need for accuracy is also less. The problem of very slightly misaligned apertures in the very first turn of material 12a on the roll on the mandrel 22 may be a smaller problem than the need to remove the innermost turn of any un-punched material on the roll.

It should be noted that since the servo drive attached to the tensioning roller set 14 typically will require a precise shaft position measurement apparatus, such as a shaft encoder, to be installed in order to allow precise tension control, the same position measurement apparatus may be employed to achieve precise position control during the pre-feed process without any additional cost.

Figure 4:
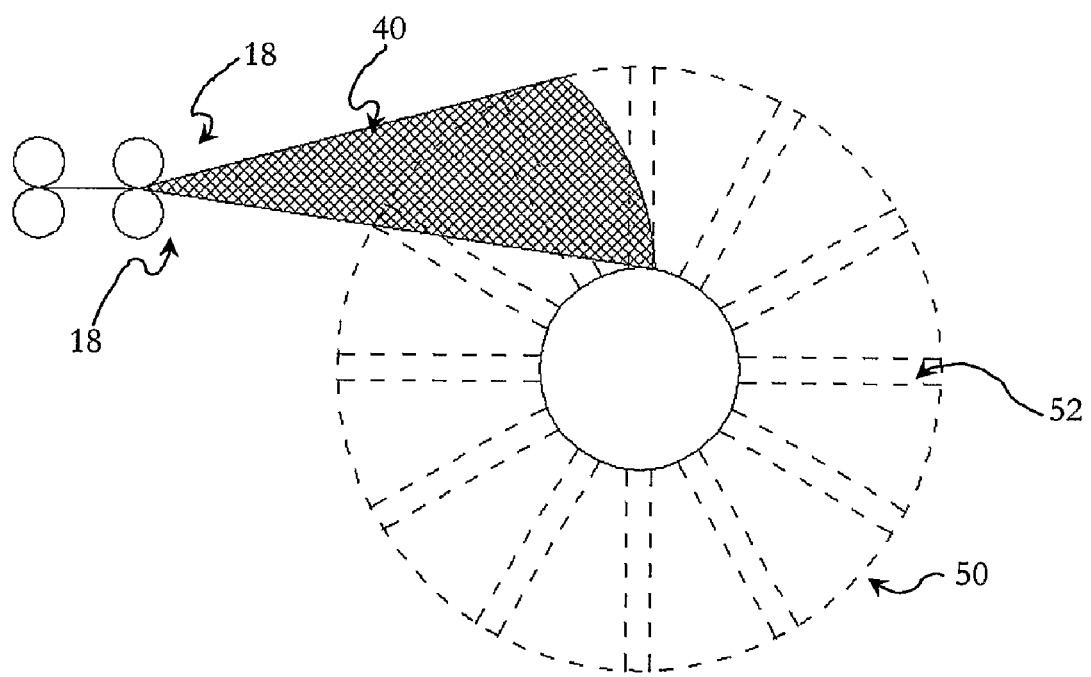
FIG. 4 schematically illustrates the range of positions adopted by the material as the core is formed.

In FIG. 2 the material 12a between the stabilising rollers 18 and the build roller 20 is shown as extending substantially horizontally. However, it will be appreciated that the angle of the path of the material 12a will change as the radius of the material on the mandrel 22 increases. FIG. 4 shows an exemplary envelope 40 of possible material paths for different radii measured by the sensor 20a on the build roller 20. From FIGS. 3 and 4 it will be appreciated that the distance BC is complex to calculate and involves determination of the point of tangent between the material 12a and the stabilising rollers 18 and the radius r. This calculation may preferably be performed iteratively using a binary search algorithm. However, many other methods exist.

It will be appreciated from the above description that a machine made in accordance with the present invention is advantageous because it does not include any translating components (such as punches or mandrels) or a ramp of the type described in U.S. Pat. No. 2,356,972. Embodiments of the invention allow the location of the mandrel and punch apparatus to be fixed. This reduces the manufacturing cost of the machine as support structures, linear bearings, hydraulic translating apparatus, springs, dampers etc are no longer required. Removal of these components has the additional benefit of reducing maintenance costs. Additionally, removal of the translating components improves the accuracy with which the apertures can be punched in the material. This is because of the reduction in error factors such as wear, slippage and vibration. Improved accuracy in aperture location in the material allows a finer tolerance in the slot edges to be achieved and improves the quality of a core manufactured using the machine.

It is also envisaged that the present invention will provide a machine that can operate at much higher speeds because of the lack of translating parts. Higher operating speeds help to reduce the manufacture time and thus the cost of each core manufactured.

The software nature of the control algorithm also allows for increased flexibility. Prior art arrangements have utilised a mechanical control system which necessitated the use of actual parts. This often limited the function of the machine due to the size and function of the parts. Embodiments of the present invention are not so limited. For example, where ratchet mechanisms were employed to control the number of slots in a core in a prior art arrangement, the present invention allows slot numbers to be adjusted by reprogramming and no retooling is required. It will also be appreciated that although the present invention enables cores having "straight sided" slots to be readily manufactured, the invention also enables cores having other configurations of slots to be reliably produced.

Additionally, the precise measurements made by the various sensors employed in an embodiment of the invention, can also be used to predict wear levels within the machine and thus predict failures and trigger preventative maintenance. Calculation of these events can be performed in parallel to the normal control of the machine by the same processing apparatus.

The foregoing description describes a punch and wind machine for producing a slotted wound core. However, it will be appreciated that the term "core" is not to be restricted to only include cores of the type used in stators.

The discussion of the background of the invention as provide herein is included to explain the context of the invention. This is not to be taken as an admission that any of the material referred to was published, known or part of the common general knowledge in Australia or in any other country as at the earliest priority date of the invention.

The embodiments have been described by way of example only and modifications within the spirit and scope of the invention are envisaged.

The invention claimed is:

1. A method of forming a slotted wound core having adjacent radial slots separated by an angle $\alpha$, said method including the steps of:
   (a) Feeding a length of material through a punch arrangement and attaching an end of the material to a mandrel;
   (b) Calculating a length BC of the material between a first point B and a second point C, where point B is the point of intercept between a punch center of the punch arrangement and the material and the second point C is the point of contact between material wound on the mandrel and a roll radius measuring means;
   (c) Determining a next aperture punch point position A on the material, said position A being determined by the steps of:
      I. Determining the angle $\theta$ about a center point of the mandrel between a radial extending to point C and a radial forming a center line of a slot which the aperture at point A will extend when laid against a circumference of the roll of material on the mandrel;
      II. Determining a length AC of material between a first point A and the second point C, where AC is determined by the equation:

$$AC = \theta\left(\frac{\theta \times t}{4\pi} + r\right)$$

Where r is the radius of the roll measured at C by the roll radius measuring means and t is the thickness of the material to be punched;
      III. Calculating a length of material AB between the first point A and a third point B, where AB is determined by the equation:

$AB = AC - BC$ (d) Calculating a mandrel rotation index angle $\gamma$ required to achieve a feed length AB;
   (e) Rotating the mandrel by index angle $\gamma$;
   (f) Punching an aperture in the material using the punch arrangement; and
   (g) Repeating steps (b) to (f) until a desired core radius is achieved.

2. A method of forming a slotted wound core according to claim 1 wherein the mandrel rotation index angle $\gamma$ is calculated using the equation:

$$\gamma = \frac{-r + \sqrt{r^2 + \frac{t \times AB}{\pi}}}{\frac{t}{2\pi}}.$$

3. A method according to claim 2 further including an initial pre-feed operation during which the material is fed until is contacts the mandrel and is then fed into a mandrel fixing means.

4. A method according to claim 1 wherein after one complete rotation of the mandrel, a permanent fixing means is applied to attach a first layer of material on the mandrel to a second layer so as to thereby prevent an inside diameter of the roll of material from unwinding when it is removed from the mandrel.

5. A method according to claim 1 wherein when a desired outside diameter of the roll of material on the mandrel is achieved, a cutting means cuts the material at a desired point and an attaching means permanently affixes the cut end of the material to the roll so as to prevent the roll unwinding.

6. A method according claim 1 further including the step of automatically ejecting the completed roll.

7. A method according to claim 1 further including the step of cutting off a first unpunched portion of the length of material on the roll so that the slots formed by the apertures in the material extend from the circumference of the roll to the center.

8. A method according to claim 1 further including the step fixing the ends of the roll to prevent inadvertent unwinding of the roll.

9. A method according to claim 1 wherein between step (a) and step (b), the initial feeding process is driven and halted using the first roll means rather than by indexing the mandrel and apertures are punched in the material at appropriate locations, resuming the feed process thereafter until the material reaches the location of a mandrel fixing means.

* * * * *

UNITED STATES PATENT AND TRADEMARK OFFICE
CERTIFICATE OF CORRECTION

PATENT NO. : 7,654,123 B2  Page 1 of 1
APPLICATION NO. : 10/597758
DATED : February 2, 2010
INVENTOR(S) : Patterson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 370 days.

Signed and Sealed this

Twenty-eighth Day of December, 2010

David J. Kappos
*Director of the United States Patent and Trademark Office*